US008682292B2

(12) United States Patent
Batkin et al.

(10) Patent No.: US 8,682,292 B2
(45) Date of Patent: Mar. 25, 2014

(54) CONTROLLING THE USE OF ACCESS POINTS IN A TELECOMMUNICATIONS NETWORK

(75) Inventors: Jonathon Batkin, Swindon (GB); Jose Luis Carrizo Martinez, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 0 days.

(21) Appl. No.: 12/452,417

(22) PCT Filed: Jun. 27, 2008

(86) PCT No.: PCT/GB2008/002226
§ 371 (c)(1),
(2), (4) Date: Sep. 27, 2010

(87) PCT Pub. No.: WO2009/004316
PCT Pub. Date: Jan. 8, 2009

(65) Prior Publication Data
US 2011/0014894 A1    Jan. 20, 2011

(30) Foreign Application Priority Data

| Jun. 29, 2007 | (GB) | 0712622.0 |
| Aug. 14, 2007 | (GB) | 0715794.4 |
| Sep. 28, 2007 | (GB) | 0718936.8 |
| Apr. 1, 2008 | (GB) | 0805913.1 |

(51) Int. Cl.
*H04M 1/66* (2006.01)
*H04M 1/68* (2006.01)
*H04M 3/16* (2006.01)

(52) U.S. Cl.
USPC ........ 455/410; 455/11.1; 455/12.1; 455/13.1; 455/417; 455/422.1; 455/423; 455/435.1; 455/554.1; 455/554.2; 455/561; 370/310.2; 370/315; 370/319; 370/320; 370/321; 370/328; 370/338

(58) Field of Classification Search
USPC ........... 455/11.1, 12.1, 13.1, 410, 417, 422.1, 455/428, 435.1, 554.1, 561, 554.2; 370/310, 310.2, 315, 319–321, 328, 370/338
See application file for complete search history.

(56) References Cited

U.S. PATENT DOCUMENTS

2007/0083470 A1    4/2007    Bonner et al.
2007/0153782 A1    7/2007    Fletcher et al.

FOREIGN PATENT DOCUMENTS

| EP | 2 041 952 A2 | 4/2009 |
| WO | WO 01/47169 A2 | 6/2001 |
| WO | WO2006/021784 A1 | 3/2006 |
| WO | WO 2007/047292 A2 | 4/2007 |
| WO | WO 2008/015414 A1 | 2/2008 |

OTHER PUBLICATIONS

3GPP TS 23.236 V7.0.0 (Dec. 2006), Technical Specification, 3rd Generation Partnership Project; Technical Specification Group Services and System Aspects; Intra-domain connection of Radio Access Network (RAN) nodes to multiple Core Network (CN) nodes (Release 7), 37 pp.

*Primary Examiner* — Steve D Agosta
(74) *Attorney, Agent, or Firm* — Muirhead and Saturnelli, LLC

(57) ABSTRACT

A GSM or UMTS mobile telecommunications network is disclosed. In addition to the conventional radio access network comprising the base stations, one or more additional access points are provided. An access point is connected to the network core by an IP transport broadband connection. The access point is configured to appear to the mobile terminal as a conventional base station—that is, it communicates with the mobile terminal using GSM or UMTS transport protocols and does not require any modification to a standard GSM or UMTS mobile terminal. Access Points are typically not under the direct control of the network provider. Arrangements are disclosed which allow the network provider to verify that the access point a mobile terminal is about to commence communicating through is at a particular location. Differential charging may be performed in dependence upon a subscriber's location.

14 Claims, 6 Drawing Sheets

CONTROLLING THE USE OF ACCESS POINTS IN A TELECOMMUNICATIONS NETWORK

TECHNICAL FIELD

The present invention relates to a method of controlling access to a telecommunications network core by a telecommunications device communicating via an IP-transport connected base station, an intermediate node for controlling access to a telecommunications network core by a telecommunications device communicating via an IP-transport connected base station, and to a telecommunications system incorporating such an intermediate node.

BACKGROUND TO THE INVENTION

Conventional access to the features and services provided by GSM and UMTS networks involves signalling between the mobile terminal and a standard base station (macro base station) that has a dedicated connection to an MSC and provides coverage in the cell occupied by the mobile terminal using cellular telecommunication (e.g. GSM or UMTS) transport protocols. There have recently been proposals to allow access to the features and services provided by GSM and UMTS networks by providing additional special base stations (femto base stations), referred to as access points (APs), for example at a subscriber's home or office, in order to increase network capacity. These access points communicate with the core network via IP based communications, such as a broadband IP network, and are typically routed via the Internet.

Many different names have been given to APs, such as home access points (HAPs), micro-base stations, pico-base stations, pico-cells and femto-cells, but all names refer to the same apparatus. APs provide short range, localized coverage, and are typically purchased by a subscriber to be installed in their house or business premises.

It has also been proposed to use APs in the Long Term Evolution (LTE) telecommunications network currently being developed, but not yet implemented. LTE is likely to be the next network implementation after 3G.

An advantage of introducing APs in existing telecommunications networks is that, where sufficient numbers of APs are implemented, the power level of the macro coverage could be reduced, due to a lower demand for the macro-base stations. Power reductions of course result in financial savings.

A further advantage of using an access point connected to the core network via an IP network is that existing broadband Digital Subscriber Line (DSL) connections can be used to link mobile terminals with the network core without using the capacity of the radio access network or transmission network of a mobile telecommunications network. In other words, the AP is integrated into a DSL modem/router and uses DSL to backhaul the traffic to the communication network.

A still further advantage is that APs are able to provide mobile network access to areas where there is no radio access network coverage. Thus, they are expected to be particularly beneficial when installed in buildings with poor radio network coverage from the macro network but which have DSL connections. Additionally, an AP could provide UMTS coverage where there is no 3G coverage at all, perhaps only GSM coverage.

However, since these access points are not conventional base stations, additional challenges arise. In particular, since the access points are typically deployed in environments not directly under the control of the network provider, it is desirable that the security of these access points can be guaranteed for each subscriber making use of them.

Currently, telecommunication network providers sometimes offer subscribers different call tariffs based on their location. For instance, one such service provides subscribers with cheaper tariffs when they use their mobile terminal in their home.

With reference to FIG. 3, in one known implementation of such a system, upon a subscriber subscribing to a reduced tariff service, the core network 140 identifies which base stations, and hence which cells, provide coverage to the subscriber's home 100. These base stations are referred to as the subscriber's home base stations. Each base station has a unique cell ID and the unique cell IDs of these home base stations are logged against the subscriber's profile. In the example of FIG. 3 the base stations with cell IDs 1245 and 1234 provide coverage over the subscriber's home and are therefore recorded alongside the subscriber's profile in the network database 160. Base station with cell ID 1256 is not recorded as a home base station as it does not provide coverage over the subscriber's home 100.

Therefore, when the subscriber is communicating on the mobile network and is located within his home 100, the subscriber's communication traffic will be routed from either of the home base stations having cell ID 1245 or 1234, through the Controller (e.g. a Radio Network Controller (RNC) in 3G) 130 and onward to the core network 140, which includes MSC 133.

During the call set up procedure, the core network will receive the MSISDN of the subscriber and the cell ID of the base station with which the subscriber is communicating. In order to confirm at which rate to change the subscriber, the core network 140 checks whether the subscriber is using one of the home base stations which cover his house 100. This check is made by consulting the Location Based Charging (LBC) Module 150 and database 160 and by comparing the MSISDN and cell ID identified in the call with those stored in the database. If the cell ID for the MSISDN is the ID of one of the subscriber's logged home base stations, the subscriber is recognised as calling from within his home and is charged at a reduced rate, otherwise he is charged at his standard rate. In the example of FIG. 3, the reduced rate will be applied when the subscriber's call is routed through base stations 1245 and 1234 but not when the call is routed through base station 1256.

With this in mind, APs provide another opportunity for network providers to offer reduced rates to subscribers. For instance, subscribers may benefit from a different call tariff when using their mobile terminal through an AP acting as a base station.

However, due to the number of access points in any network being potentially much higher than the number of base stations in a macro network, if access points are treated in the same way as normal base stations, there is likely to be a substantially increased processing workload for the network, which is undesirable.

To further illustrate, mobile telecommunications networks have around 10000 to 20000 macro base stations in the network, each with a unique cell ID. By comparison, the expected wide scale deployment of access points in houses and businesses is likely to number in the millions. If each of these access points were to be given a unique ID (Access Point ID, AP ID) in a similar way to base stations in the macro network, and recognition of the tariff was made by the core network by checking against the subscriber's logged AP ID, then the processing power required by the core network would be enormous, and potentially unmanageable.

Further additional challenges arise in implementing these access points as conventional base stations, in view of their potential mobility. Ideally APs are introduced into a telecommunications network and remain fixed at that site. However, there is the possibility that subscribers may decide to relocate their access point for use at a different site. This would be problematic where the subscriber obtains a reduced tariff for using their AP as a base station from their home, as potentially they would be able to also receive the reduced tariff at other locations by relocating the AP. There is therefore the need for determining the location of an AP in order to determine whether or not a reduced tariff is to be used.

A further problem in regard to the mobility of APs is that mobile telecommunication providers are allocated spectrum in specific regions, so it is vital that they are able to identify the location of all their base stations, which includes APs, since APs are functionally equivalent to macro base stations. In fact, proposed regulatory regulations are likely to require telecommunications providers to know the location of all access points in their network. There is therefore also a need to determine the location of an AP before allowing a communication to proceed or before an AP is activated.

SUMMARY OF THE INVENTION

In one aspect the present invention provides a method of controlling access to a telecommunications network core by a telecommunications device communicating via an IP-transport connected base station, the method including providing an intermediate node between the base station and the core for receiving identification data from the base station and for generating at the intermediate node an indication of the basis on which the telecommunications device is permitted to receive communication services from the core.

Conventionally, the core would determine the basis on which the telecommunications device is permitted to receive communication services from the core. However, this requires the core to maintain a database of the identity of each cell/base station, together with the details of the basis on which that telecommunications device is permitted to receive communication services via that cell/base station. While such a solution may be acceptable when the base stations are conventional macro base stations, as discussed earlier, when APs are used as base stations, the number of base stations of a telecommunications network may increase very significantly. For the network core to store for each such base station the basis on which a telecommunications device is permitted to receive communication services from the core via that base station would represent a huge burden for the core. By providing the intermediate node which is able to generate an indication of the basis on which the telecommunications device is permitted to receive communication services from the core, this burden is lifted from the core and transferred to the intermediate node.

The indication of the basis on which the telecommunications device is permitted to receive communication services from the core may be an indication of the charge that will be made for the communication services. If the base station is an AP, the core may provide communication services to particular telecommunications devices at a beneficial rate. These users might be the owners of the AP. The AP may further allow other telecommunications device users to access the core and obtain communication services via the AP. These other users are visitors and may be charged for obtaining communication services from the core on a different basis.

The intermediate node may be a concentrator. The concentrator is preferably but not necessarily a component of the radio network controller (RNC) of the telecommunications network.

The indication generated at the intermediate node is advantageously of the same format as an indication of the identity of the cell occupied by the telecommunications device that is conventionally transmitted between the base station and the core network. The indication of the identity of the cell may comprise the cell ID, Service Area Code—SAC—or Service Area Identity—SAI.

In the embodiments to be described in more detail the intermediate node determines the basis on which the telecommunications device is permitted to receive communication services from the core, and this allows the intermediate node to generate indication of the basis on which the base station is permitted to receive communication services from the core. In the embodiments the intermediate node consults a database associated therewith, which database indicates for the cell occupied by the telecommunications device the basis on which the telecommunications device is permitted to receive communication services from the core.

In the embodiments the intermediate node receives from the base station the identity of the cell occupied by the telecommunications device. This received identity information may be a cell ID, SAC or SAI. The received information may also be an identifier of the base station (e.g. an AP ID).

In the first embodiment, in dependence upon the determination of the basis on which the telecommunications device is permitted to receive communication services from the core, the intermediate node selectively includes in the indication generated thereby a reserved value ("Reserved Cell ID" in the embodiment) indicative of the basis on which the telecommunications device is permitted to receive communication services from the core via the base station but which indication is not used or usable by the core to identify the particular base station.

In an alternative embodiment, in dependence upon the determination of the intermediate node of the basis on which the telecommunications device is permitted to receive communication services from the core, the intermediate node selectively generates the indication to include a flag indicative of the basis on which the telecommunications device is permitted to receive communication services from the core via the base station, the indication further including the identity of the cell occupied by the telecommunications device. The core may then receive the communication including the flag and modify the indication to include a reserved value (the "Reserved Cell ID" in the embodiment) indicative of the basis on which the telecommunications device is permitted to receive communication services from the core but which indication is not used or usable by the core to identify the particular base station. In this embodiment the core may include means for determining whether a communication from the telecommunications device relates to an emergency, and means for routing the communication to an appropriate one of a plurality of emergency centres in dependence upon the identity of the cell occupied by the telecommunications device.

In these embodiments the reserve value indicates the charging scheme to be applied by the core to the communication services.

In the embodiments, the reserved value is received by a location based charging service of the core, and this location based charging service uses the reserved value to look-up in a database the basis on which the telecommunications device is permitted to receive communication services from the core so that the user of the telecommunications device can be charged accordingly for the communication services.

Various arrangements are disclosed for enabling the intermediate node to determine whether the base station is a valid base station. If it is determined that the base station is not a valid base station, then steps can be taken to prevent the base station from communicating with the core. This prevents wastage of core network resources because the intermediate node intercepts bogus communications from invalid base stations.

The intermediate node may determine whether the base station is a valid base station on the basis of the identity of the cell occupied by the telecommunications device. The determining step may comprise identifying the base station by determining a routing identifier of the base station—such as an IP address or DSL ID. The determining step may alternatively comprise identifying the base station by determining the telephone number of the base station, for example by CLI. The intermediate node may be provided with an identifier of the telecommunications device (e.g. MSISDN or IMSI) in the conventional signalling. The intermediate node can then look up whether the telecommunications device is permitted to use that particular cell.

According to another aspect of the present invention, there is provided an intermediate node for controlling access to a telecommunications network core by a telecommunications device communicating via an IP-transport connected base station, as defined in the claims. The present invention also provides a system including such an intermediate node, telecommunications network and IP-transport connected base station.

BRIEF DESCRIPTION OF THE DRAWINGS

For a better understanding of the present invention embodiments will now be described by way of example, with reference to the accompanying drawings, in which.

DETAILED DESCRIPTION OF EMBODIMENTS OF THE INVENTION

Figure 1:
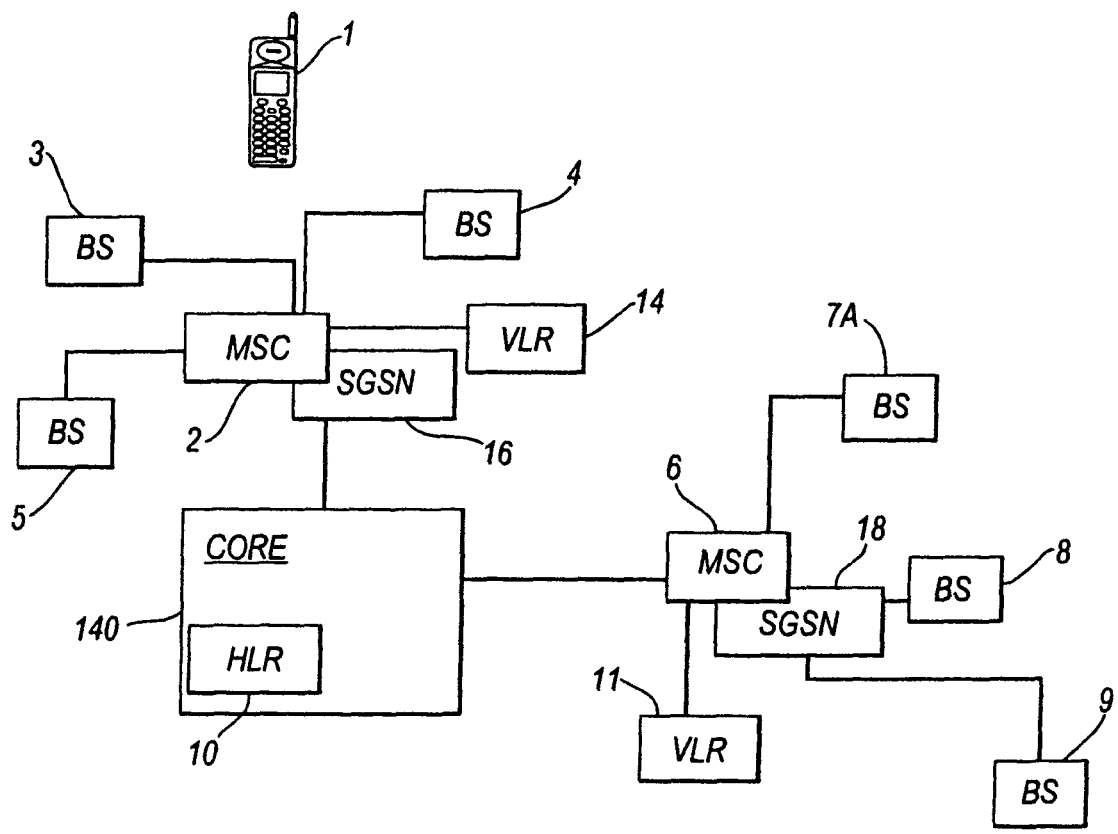
FIG. 1 is a diagrammatic drawing of key elements of a mobile telecommunications network.

Key elements of a mobile telecommunications network, and its operation, will now briefly be described with reference to FIG. 1.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal is shown at 1. The mobile terminal may be a handheld mobile telephone, a personal digital assistance (PDA) or a laptop computer equipped with a datacard.

In a GSM mobile telecommunications network, each base station comprises a base transceiver station (BTS) and a base station controller (BSC). A BSC may control more than one BTS. The BTSs and BSCs comprise the radio access network.

In a UMTS mobile telecommunications network, each base station comprises a node B and a radio network controller (RNC). An RNC may control more than one node B. The node B's and RNC's comprise the radio access network.

In the proposed LTE mobile telecommunications network, each base station comprises an eNode B. The base stations are arranged in groups, and each group of base stations is controlled by a Mobility Management Entity (MME) and a User Plane Entity (UPE).

Conventionally, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7A, 8 and 9. In practice, the network will incorporate many more MSCs and base stations than shown in FIG. 1. The base stations 3, 4, 5, 7A, 8 and 9 each have dedicated (not shared) connection to their MSC 2 or MSC 6—typically a cable connection. This prevents transmission speeds being reduced due to congestion caused by other traffic.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLRs 11, 14 used in the packet switched domain.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) that is not visible on the card and is not known to the subscriber. The subscriber is issued with a publicly known number, that is, the subscriber's telephone number, by means of which callers initiate calls to the subscriber. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile terminal.

When mobile terminal 1 is activated, it registers itself in the network by transmitting the IMSI (read from its associated SIM card) to the base station 3 associated with the particular cell in which the terminal 1 is located. In a traditional network, the base station 3 then transmits this IMSI to the MSC 2 with which the base station 3 is registered. In a network using the functionality described in 3GPP TS 23.236, the base station follows prescribed rules to select which MSC to use, and then transmits this IMSI to the selected MSC.

MSC 2 now accesses the appropriate storage location in the HLR 10 present in the core network 140 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, they enter the telephone number of the called party in the usual manner. This information is received by the base station 3 and passed on to MSC 2. MSC 2 routes the call towards the called party. By means of the information held in the VLR 14, MSC 2 can associate the call with a particular subscriber and thus record information for charging purposes.

The functionality just described may also apply to the proposed LTE mobile telecommunications network, with its eNode Bs performing the functionality of the base stations and the MME/UPE performing the functionality of the MSCs/VLRs. It is also to be appreciated that the functionality just described is one example of a network in which the embodiments of the invention may be implemented.

Figure 2:
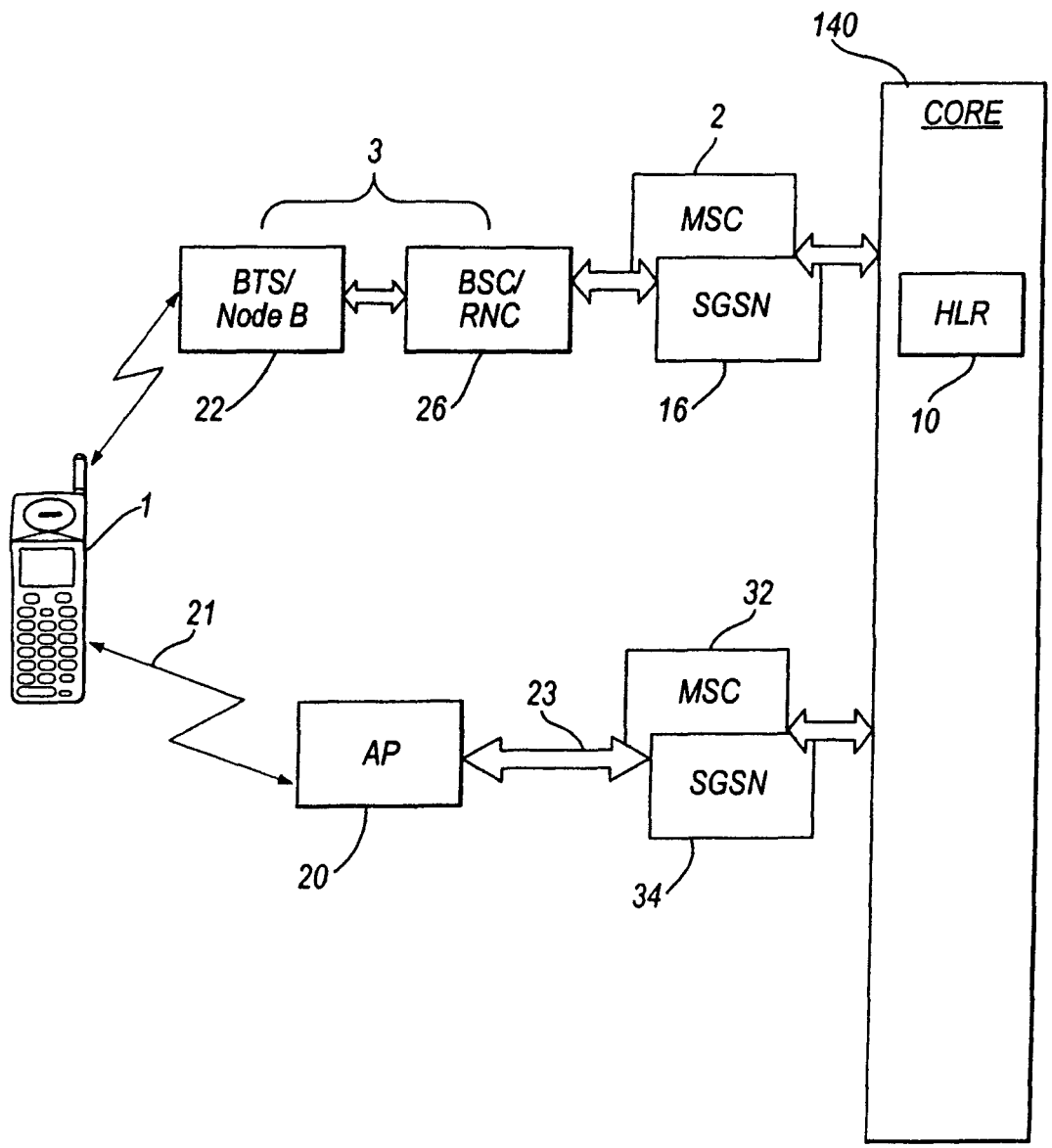
FIG. 2 shows a modified mobile telecommunications network for receiving IP based communications from an access point in addition to communications from a conventional base station.

FIG. 2 shows elements for providing access to a GSM or UMTS network by both a conventional base station 3 and an access point (AP 20). The AP 20 communicates with the mobile terminal 1 via a radio link 21.

In the embodiments, the radio link 21 between the AP 20 and the mobile terminal 1 uses the same cellular telecommunication transport protocols as the conventional base station 3 but with a smaller range—for example 25 meters. The AP 20 appears to the mobile terminal 1 as a conventional base station, and no modification to the mobile terminal 1 is required to operate with the AP 20. The AP 20 performs a role corresponding to that of a GSM BTS 22 and BSC 26 and/or UMTS Node B and RNC and/or an LTE eNode B.

Communications 23 between the access point 20 and the core network 140 are IP based communications, and may be, for example, transmitted over a broadband IP network (and routed via the Internet). The communications are routed via MSC 32 or SGSN 34. The access point 20 converts the cellular telecommunications transport protocols used for signaling in conventional GSM or UMTS networks used between the mobile terminal 1 and the AP 20 to IP based signalling.

The connection 23 between the access point 20 and the core network 140 may use the PSTN telephone network. Typically a DSL cable connection connects the access point 20 to the PSTN network. The data is transmitted between the access point 20 and the core network 140 by IP transport/DSL transport (a backhaul connection).

The access point 20 may be connected to the core network 12 by means other than a DSL cable and the PSTN network. For example, the access point 20 may be connected to the core network 140 by a dedicated cable connection that is independent of the PSTN, or by a satellite connection between the access point 20 and the network core 140.

Using an access point 20 connected to the core network via an IP network does have advantages. Existing broadband DSL connections can be used to link mobile terminals with the network core 140 without using the capacity of the mobile telecommunications network radio access network, or where there is no conventional radio access network coverage. For example, UMTS coverage could be provided by an access point 20 where there is no conventional UMTS coverage (perhaps only GSM coverage).

AP 20 may be configured to serve a WLAN located in a home or office, in addition to GSM/UMTS/LTE networks. The WLAN could belong to the subscriber of the mobile terminal 1, or be an independently operated WLAN.

The owner of AP 20 can program the AP so that it is either "open" or "closed", whereby an open AP is able to carry communications from any mobile device in the GSM/UMTS network, and a closed AP is only able to carry communications from specific pre-designated mobile devices.

With this background in mind, a first embodiment of the invention will now be described in relation to FIG. 4.

Figure 3:
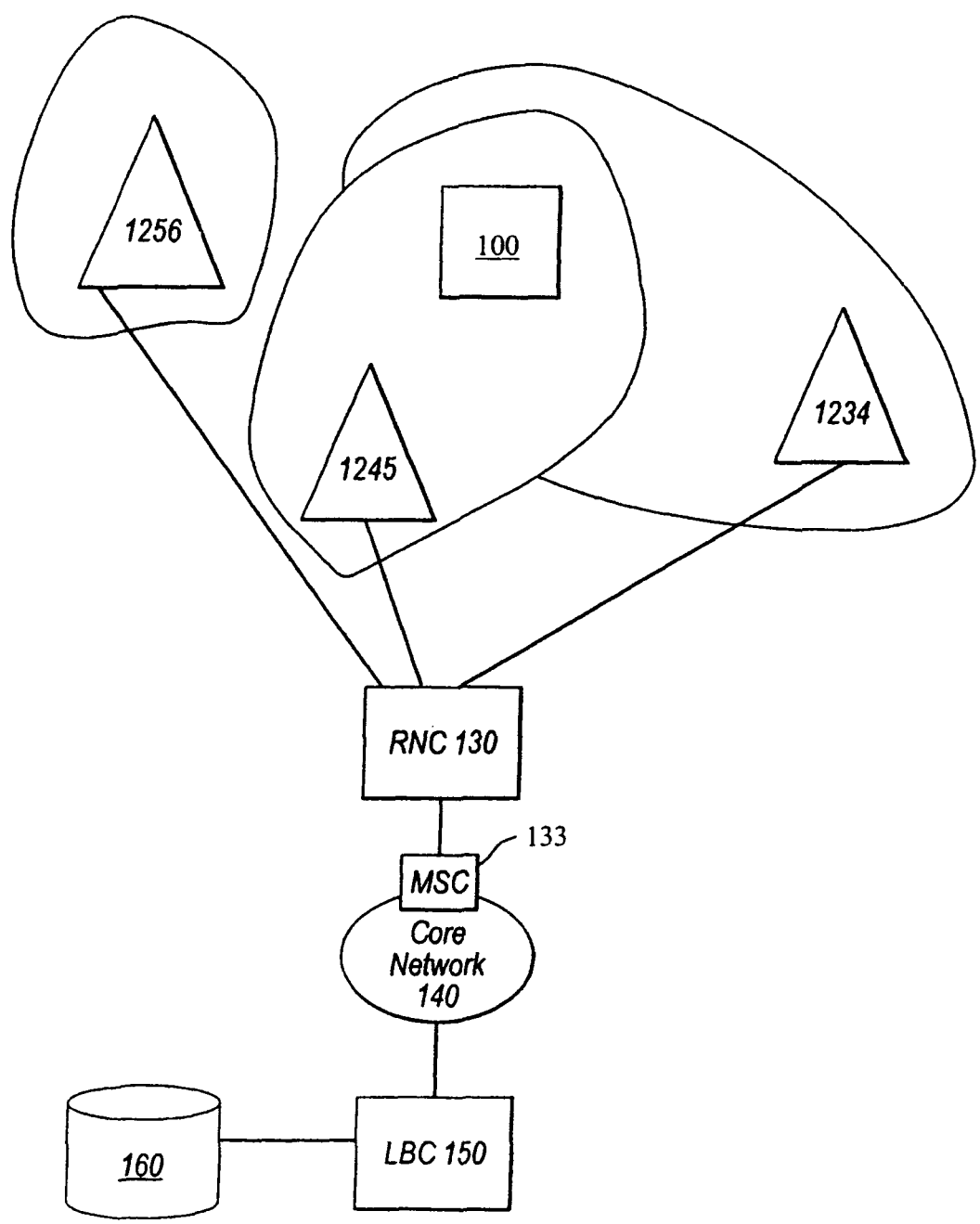
FIG. 3 shows a diagrammatic drawing of key elements of a mobile telecommunications network for use in explaining a known approach of reducing tariffs for subscribers using mobile terminals when at home.
Figure 4:
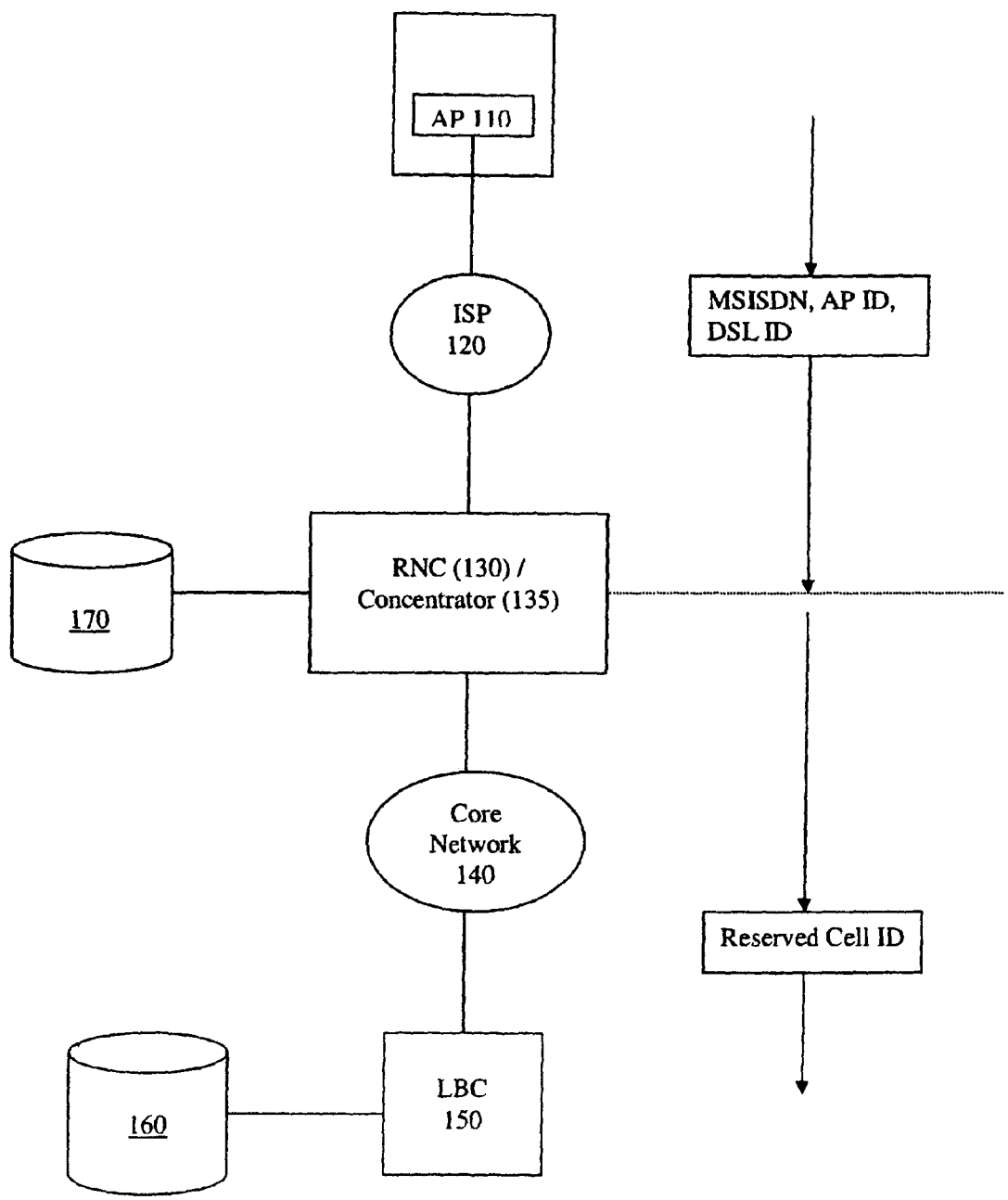
FIG. 4 illustrates a mobile telecommunications network including an AP according to an embodiment of the invention.

FIG. 4 shows the components that carry communication traffic between a mobile communication device and the core network when a call is routed through AP 110 installed in the subscriber's home or workplace. The coverage area of the AP will typically be smaller than a macro base station but generally will be sufficient to cover the whole area of the premises. Generally one or more macro base stations, as in FIG. 3, will also cover the premises, but these are not shown in FIG. 4.

The AP is connected to a DSL line of the premises. All communications from the AP are transmitted along the DSL and to an Internet Service Provider (ISP) 120. Typically, the ISP 120 will receive communications from multiple APs, and so will include a Digital Subscriber Line Access Multiplexer (DSLAM) and a data switch, for multiplexing a plurality of customer communications and routing them to the Radio Network Controller (RNC) 130.

Each AP has a unique identifier (AP ID). The AP ID may be a Media Access Control address (MAC address) identifying the access point. The MAC address is a generally unique code assigned to most forms of networking hardware. The address is generally permanently assigned to the hardware, so each access point has a unique MAC address. The access points may however be identified by some other form of unique access point identifier.

Additionally, the specific DSL connection into which the AP is plugged has a unique ID (DSL ID). As the DSL ID is mapped to a specific geographic location, the network can determine the location of that DSL when the AP is installed and/or registered by determining the DSL ID to which the AP is attached. The network therefore determines the AP ID and DSL ID, upon installation/registration of the AP, and stores this information on the subscriber's account along with the subscriber's MSISDN. As an alternative to the DSL ID, the IP address of the AP may be used to identify it.

According to this first embodiment of the invention, the AP ID and DSL ID are stored in database 170, which is associated with concentrator 135. In a 3G network, concentrator 135 is preferably a component of Radio Network Controller (RNC) 130, but may also be an entirely separate node, preferably functionally situated immediately before or immediately after the RNC 130. The concentrator 135 may also be implemented in as a software application and/or using specific hardware.

The concentrator 135 is configured to perform functionalities specifically relating to the subscriber's AP, such as:
1) verifying the location of the AP;
2) verifying whether or not the subscriber is entitled to use the AP; and/or
3) verifying whether or not the subscriber is entitled to a reduced tariff when using the AP.

An advantage of the concentrator 135 is that it simplifies the processing required by the core network 140. In other words, by having the concentrator 135 perform the additional functionalities required due to incorporating APs in the telecommunications network little or no additional software or hardware modifications need to be made to the core network 140.

Firstly considering the AP location verification functionality, when a subscriber is in his home location, traffic from his mobile terminal will be directed through AP 110 and onto the DSL line. The standard call-set up data traffic is transmitted along with the subscriber's MSISDN, the AP ID and the DSL ID.

When this data arrives at the concentrator 135, the concentrator 135 will verify the location of the AP 110, by looking up and retrieving the appropriate data from database 170. In this regard, the concentrator 135 may look up the AP ID and retrieve the DSL ID associated with that AP ID or vice versa. If the retrieved data matches the data transmitted to the concentrator 135 then the concentrator 135 will have verified that the AP 110 is plugged in at its correct location.

If the retrieved data does not match the transmitted data, then this will indicate that the AP 110 is not plugged in at its correct location. If this occurs, the communication request can, for instance, be terminated. To achieve this, the concentrator 135 may simply decide to not transmit the call set up request to the core network 140. Therefore, in this way, the validity of an AP set up can be determined before the core network 140 expends resources in setting up the communication.

Next considering the second concentrator functionality, of the concentrator 135 verifying the entitlement of a subscriber to use the AP 110 as an access point to the mobile telecommunications network, as in the previous example, the concentrator 135 will receive the initial call set up information, together with the DSL ID, AP ID and the subscriber's MSISDN from ISP 120. The concentrator 135 will then look up and retrieve the appropriate data from database 170. If the subscriber's MSISDN is associated with the AP ID and/or the DSL ID in the database 170, then the concentrator 135 will have verified that subscriber is entitled to use the AP 110. Most preferably, the subscriber's MSISDN will match both of the logged AP and DSL IDs.

If the subscriber is not registered to use the AP 110, the concentrator 135 will terminate the call at that point. In further embodiments the concentrator 135 may transmit an indication back to the phone that it is not permitted to communicate on the AP 110 and that it should switch to the macro network. This is therefore a second example of how the concentrator 135 can be used to minimise wastage of the core network's resources.

Of course, if the AP 110 is designated as an open AP, the second concentrator functionality is not required.

Instead of identifying the subscriber by their terminal's MSISDN, the terminal could instead (or additionally be identified by its IMSI). The database 170 is therefore modified to include IMSIs instead of (or as well as MISISDNs).

Next considering the third functionality, the concentrator 135 is configured to determine whether a particular subscriber is entitled to a tariff reduction when using a given AP as an entry point to the mobile network.

Subscribers that are entitled to a reduced tariff through an AP are typically referred to as "owners" and subscribers that are permitted to use the AP but are not entitled to the reduced tariff are referred to as "visitors". Subscribers who are neither 'owners' nor 'visitors' for a particular AP may not be entitled to use the AP. On identifying such a subscriber attempting to call through the AP, the network may not route the call through the AP but, instead, may terminate the call or route the call onto the macro network. The subscribers are identified by their MSISDNs. Alternatively, or additionally, the subscribers could be identified by IMSI.

The MSISDNs of all owners are stored in the database 170 along with the MAC address/AP ID and IP address/DSL ID. These MSISDNs may be confirmed during registration or installation or may be added to the database at a later date. The owners and visitors are stored in different lists or fields to distinguish between the two.

If the AP 110 is a closed AP, the database will also include MSISDNs of the visitors. An open AP is able to carry communications from any mobile device in the GSM/UMTS/LTE network, whereas a closed AP is only able to carry communications from specific pre-designated mobile devices. Typically an owner of an AP is able to designate whether their AP is open or closed.

Table 1 provides an example of data that would be stored in the database 170 for a closed AP allowing two "owners" a reduced tariff when using the AP, and four "visitors" access to the mobile network via the AP, but on their normal tariff.

TABLE 1

| AP ID | Owner MSISDN | Visitor MSISDN (closed AP only) | DSL-ID |
|---|---|---|---|
| AP-123 | 07766xxxxx1 07766xxxxx2 | 07766xxxxx3 07766xxxxx4 07766xxxxx5 07766xxxxx6 | VF-123 |

Considering the Table 1 example, when a subscriber makes a call through the AP, the concentrator 135 will receive the subscriber's MSISDN together with the applicable MAC address/AP-ID and/or IP address/DSL-ID. To verify whether the subscriber is authorised to a reduced tariff, the concentrator 135 checks the received data against the data recorded in database 170. For example, if the subscriber's MSISDN is listed as an "owner" in relation to the received AP ID and/or DSL ID, then the subscriber will be entitled to a reduced tariff for that call. More specifically, with reference to Table 1, where the received AP ID is AP-123, the received DSL-ID is VF-123 and the subscriber's MSISDN is 07766xxxxx1 or 07766xxxxx2, the access controller will verify the subscriber as an owner entitled to a reduced tariff.

On the other hand, where the subscriber's MSISDN is one of 07766xxxxx3-6 that subscriber will be verified by the access controller as a visitor, and therefore permitted to communicate through AP-123 when connected to DSL-ID VF-123, but not entitled to a reduced tariff. Additionally, as this example is in relation to a closed AP, any further subscribers, for example 07766xxxxx7, will not permitted to use the AP at all.

Preferably both the received AP ID and DSL ID values match those in the database 170 in order to benefit from the reduced tariff. This is because, if the AP ID and MSISDN match those in the database, but the DSL ID does not match, this will imply that the subscriber is using the AP from a different location to that for which the AP is registered. Therefore it is preferable that the subscriber is not entitled to a reduced tariff for that call.

It is to be appreciated that the network may allow a subscriber to register multiple IP addresses/DSL IDs for a given AP. This would allow the owner of an AP some flexibility in using the AP in a plurality of different registered locations.

In a variation of this embodiment, rather than the subscribers obtaining a reduced tariff, an alternative benefit is provided to the subscriber. For instance other benefits that may be implemented include a benefit in a loyalty scheme or free air-time on the macro network.

In a still further variation of this embodiment, the owner and visitor fields may be implemented to provide subscribers in each particular field different tariff reductions or different benefits. For instance, the subscribers listed in the visitor field, may also receive a tariff reduction when using the AP to access the mobile telecommunications network, but the reduced tariff will be a different tariff reduction to that provided to subscribers listed as "owners". Alternatively, or in addition, the owner may receive a benefit when a visitor makes use of the AP.

Again referring to FIG. 4, once the concentrator 135 has made a reduced tariff determination, the concentrator 135 transmits an indication to the core network 140 of whether or not the subscriber is entitled to a reduced tariff for that call.

According to an important feature of this embodiment of the invention, this indication is made in the same format as a cell ID that would normally be sent to the core network 140 to identify a base station. The concentrator 135 substitutes the cell ID received from the base station with a predefined ID value indicating whether the MSISDN is a visitor or owner. For example, the predefined value identifying that the subscriber is an owner might be "1111" and the predefined value identifying that the caller is a visitor could be "0000".

For present purposes this new form of Cell ID created by the concentrator 135 will be termed a "Reserved Cell ID". The Reserved cell ID is received by the core network 140 in the same manner as it would receive a cell ID from a macro base station. In this regard, as discussed in relation to FIG. 3, at call set up, the serving base station transmits its cell ID to the network.

Therefore, once the concentrator 135 determines if the subscriber is a registered owner/visitor, the concentrator 135 enters the appropriate code in the Reserved Cell ID, and the Reserved Cell ID along with the other call set up traffic, is transmitted to the core network 140 as part of the normal call set up procedures.

In a 3G system, the RANAP call set up procedure applies, wherein the Service Area Code (SAC) is typically used to identify one or more cells within a Location Area. Therefore, in a 3G system, in the "Initial UE Message" of the RANAP call set up procedure, this reserved cell ID would be represented by the Service Area Code (SAC) in the Service Area Identifier (SAI). Therefore, in this 3G example, the SAC is used to identify an "owner" or a "visitor" of the AP.

Once the Core Network 140 receives the Reserved Cell ID in the call set up procedure, it extracts the cell ID and passes it to the Location Based Charging (LBC) service logic 150 component of the Intelligent Network (IN), which determines on what tariff the call should be charged. Normally the LBC service logic 150 uses the cell ID to query the LBC database 160, which stores the details of the cell IDs of the home macro base stations, for which each MSISDN is entitled to reduced tariffs.

The LBC database 160 compares the received MSISDN and cell ID with those stored in the database. It then informs the core network whether the call should be charged at reduced tariff or at the full tariff. In the present embodiment of the invention, with the concentrator 135 having already determined whether a reduced tariff applies, and notifying the core network 140 of such using the special codes in the reserved cell ID, the LBC database 160 can be used simply to record the meaning of the reserved cell ID codes rather than performing a full database query, and also rather than recording the potentially huge number of network APs in database 160.

In this regard, an advantage provided by this embodiment of the present invention is that the core network and LBC do not have to recognise each and every AP ID and DSL ID. Instead, the concentrator 135 manages all AP IDs and DSL IDs. Therefore, in effect, this embodiment of the invention is able to identify whether or not a subscriber is entitled to a reduced tariff for a call by managing only two further cell IDs, namely one for the subscriber being an owner and one for the subscriber being a visitor. For example, if the home of FIG. 3 is the same as that of FIG. 4, the database 160 will reflect that the subscriber is entitled to calls at a reduced tariff if the cell ID is any of Cell IDs 1234, 1245 and 1111.

Therefore, the core network 140 and Intelligent Network (IN), that handle the LBC service logic, do not need to have their functionality altered in any way to implement the Reserved Cell ID solution. The core network 140 and IN can therefore continue to receive set up requests through APs in the same form as received from macro base stations, namely with a cell ID. Further, the LBC can identify how to charge the subscriber in the same way in which it manages calls though macro base stations, and as part of the same procedure. Thus, when a subscriber registers a new AP, only a single cell ID (that of the positive Reserved cell ID) need be added to subscriber profiles.

In a variation of this embodiment of the invention, rather than the LBC 150 and LBC database 160 simply identifying whether or not subscriber is entitled to a reduced tariff, the reserved cell IDs can be used to specifically identify different tariffs. For example, an "owner" subscriber may be entitled to a first tariff and a "visitor" subscriber a second, probably higher, tariff.

In the embodiment described the AP is closed; that is, an AP which can only be used by users who have been previously registered. Two types of users are considered:
  a) an owner or member, who is applied a special rate when accessing services via the AP;
  b) a guest or visitor, who is allowed to get normal service from the AP and for whom the tariff applied is the same as when accessing via the macro network, A given user has a given role in a given AP, but can have other roles in other APs. The principle of differential charging is that the home AP will allow the differentiation of the user type related to the AP being used in order to derive the correct tariff to be applied.

Figure 5:
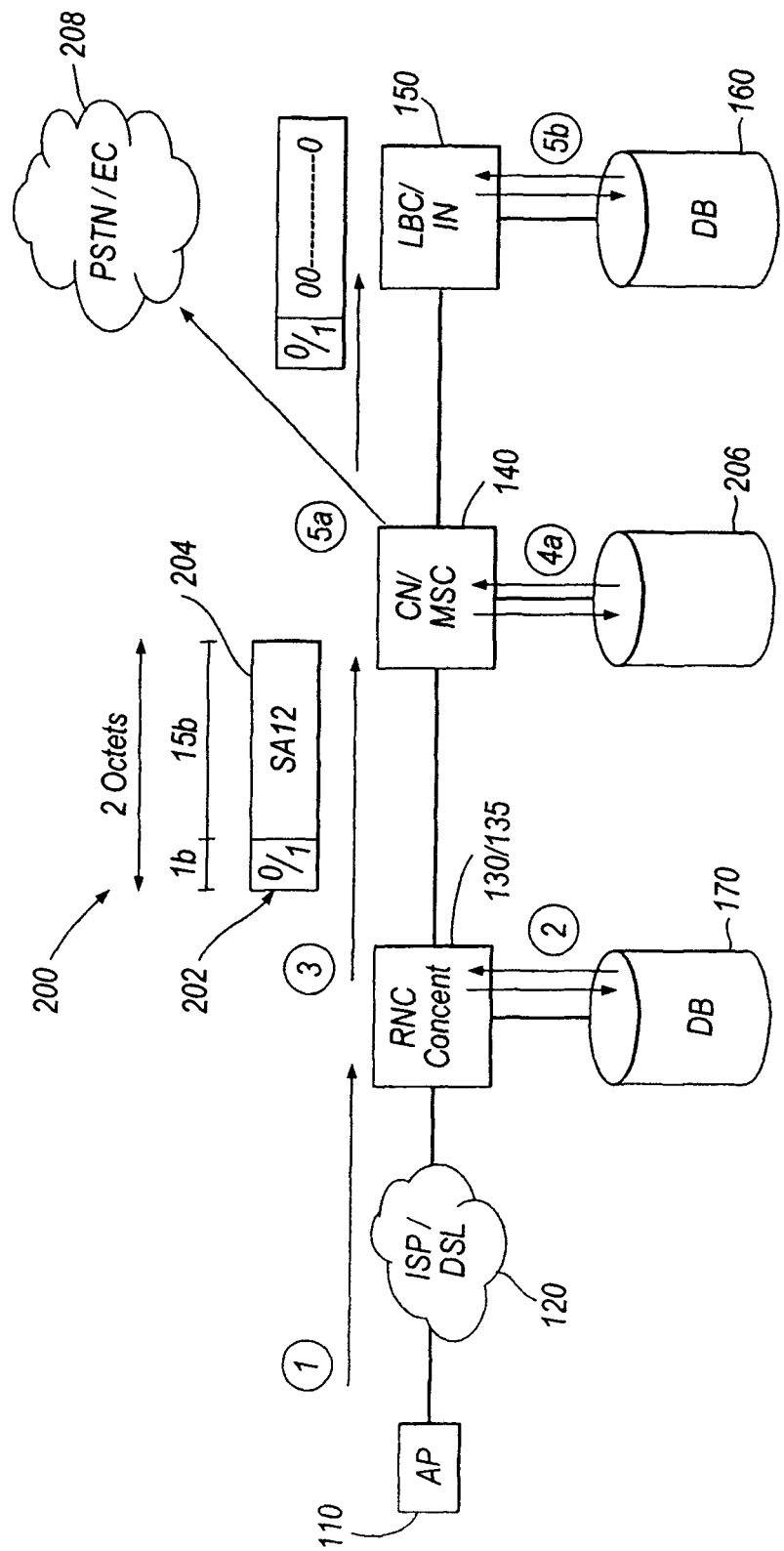
FIG. 5 illustrates a mobile telecommunications network including an AP according to a modified embodiment of the invention for making emergency calls.

According to a further embodiment of the invention shown in FIG. 5, modifications are made to facilitate handling of emergency calls.

Two requirements need to be met for the correct handling of emergency calls, both in the macro and the femto network, regarding the location of the user:
  the location is used to determine the correct Emergency Centre to which to route the call
  the location is optionally provided to the Emergency Centre.

In the embodiment, a mechanism is in place to control the access to the AP 110 only allowing those that are either owners (members) or visitors (guests).

In this embodiment, each AP is allocated the following identifiers:
  Location Area Identity (LAI)
  Service Area Identity (SAI)
  AP identity (AP ID): this is a unique identity to identify the AP The service area identity (SAI) comprises the PLMN-Id+ Location Area Code (LAC)+SAC.

The database 170 stores user IDs (MSISDN or IMSI), AP IDs (or DSL IDs), the relationship between the users and the APs (whether they are members or guests), and the SAI for each AP.

The steps of the proposed handling of the call are:
  1. The call is initiated by the user, via the AP 110 and the access network (ISP, DSL 120) and reaches the RNC/concentrator 130/135. The RNC/concentrator is able to know from which AP the call is made, e.g. based on the DSL line used or on the unique AP identity.

2. The RNC/concentrator 130/135 queries the database 170 in order to determine the type of the user for this particular AP using the received MSISDN. The result of the query allows the RNC/concentrator 130/135 to differentiate between members and guests.

3. The AP ID or SAI field 200 in the message from the RNC/concentrator 135 to the Core Network 140 is coded containing two pieces of information:

The user type (or flag) 202 and therefore which tariff should be applied; this could be coded with a single bit if there are only two states (e.g. "1"=member and "0"=guest).

The SAI 204 of the AP 110, with the rest of the bits of this 2 octet field.

Information received from the RNC/concentrator 130/135 allows the MSC 140 to determine whether the call is a emergency call or another call type.

a) If the call is an emergency call:

4. The MSC of the core network 140 uses the received SAI of the AP to determine to which Emergency Centre to route the call by consulting database 206 which indicates which Emergency Centre corresponds to which SAIs. For example, there may be 12 Emergency Centres, each serving part of a territory. Each SAI is allocated to one of the 12 Emergency Centres in the database 206.

5. The call is routed to the correct Emergency Centre, for instance, routed to the PSTN 208 with additional information to identify the correct Emergency Centre.

b) For other calls:

4. The MSC of the core network 140 passes the call to the LBC service logic 150 of the IN system, preserving the portion of the user type field 202 that reflects the user type and replacing the rest of the bits by a pre-defined pattern.

5. The LBC service logic 150 of the IN system queries the LBC database 160 to determine whether the given SAI/AP ID is one of the cells for which special charging arrangements apply. The SAI/AP ID resulting from the identification of the call being made by a member is (e.g. 1111). The SAI/AP ID resulting from the identification of the call being made by a guest is (e.g. 0000). These IDs are Reserved Cell IDs and are never used as a valid SAI/AP ID across the mobile network.

The Core Network 140 passes the Reserved Cell ID to the Location Based Charging (LBC) service logic 150 component of the Intelligent Network (IN), which determines on what tariff the cell should be charged. Normally the LBC service logic 150 uses the SAC/cell ID to query the LBC database 160, which stores the details of the cell IDs of the home macro base stations, for which each MSISDN may be entitled to reduced tariffs.

The LBC database 160 compares the received MSISDN and SAI/AP ID/Reserved Cell ID with those stored in the database. It then informs the core network whether the call should be charged at reduced tariff or at the full tariff. In the present embodiment of the invention, with the concentrator 135 having already determined whether a reduced tariff applies, and notifying the core network 140 of such using the user type field 202. The core network 140 then allocates a special Reserved Cell ID (e.g. 1111 or 0000) in dependence upon the user type field (flag) 202 and sends the Reserved Cell ID to the LBC logic 150. The LBC database 160 can, as in the previous embodiment, be used simply to record the meaning of the reserved cell ID codes rather than performing a full database query, and also rather than recording the potentially huge number of network APs in database 160.

In this regard, an advantage provided by this embodiment of the present invention is that the core network and LBC do not have to recognise each and every AP ID and DSL ID. Instead, the concentrator 135 analyses the AP IDs and DSL IDs to determine whether the mobile terminal is a member or guest. This subsequently allows the core network 140 to set an appropriate Reserved Cell ID. Therefore, this embodiment of the invention is able to identify whether or not a subscriber is entitled to a reduced tariff for a call by managing only two further SACs/cell IDs, namely one for the subscriber being a member and one for the subscriber being a guest.

Therefore, the Intelligent Network (IN 150), that handles the LBC service logic, does not need to have its functionality altered in any way to implement the Reserved Cell ID solution. The IN 150 can therefore continue to receive set up requests through APs in the same form as received from macro base stations, namely with a cell ID. Further, the LBC service logic can identify how to charge the subscriber in the same way in which it manages calls through macro base stations, and as part of the same procedure.

The appropriate charge for the call can then be made.

According to an additional embodiment, in which the IP address is used to identify the AP, it is possible that the AP is allocated a dymamic IP address. In this situation, upon receiving the IP address the concentrator 135 recognises that the relevant AP ID/MAC address was associated with a dynamic IP address. The concentrator 135 would therefore then interrogate the dynamic IP address provider to determine what the current IP address assigned to the AP was, and compare that address with the one received from the AP in order to ascertain whether or not the AP was a legitimate AP.

Alternatively, the concentrator 135 may regularly interrogate the dynamic IP address provider in order to ensure that the dynamic IP addresses in the list of APs is continually kept updated. As a further alternative, the dynamic IP address provider may have the responsibility of notifying the concentrator 135 when each dynamic IP address is allocated in order to maintain an up-to-date list of allowed APs.

When the AP is connected via a DSL cable, in certain situations, the DSL ID will not be made available to the network provider. Typically, if the network provider is acting as the ISP or if a company that has a relationship, for example a partnership, with the network provider provides the ISP, the network provider will be given access to the DSL ID associated with communications to and from the access point. However, if the network provider has no relationship with the ISP, the network provider will probably not be made aware of the location at which the access point is plugged into the ISP. Therefore, if a subscriber wishes to install an access point for use on their existing Internet Service Provider (ISP) the network may not gain any visibility of the DSL IDs into which its access points are plugged. In such a case, the traffic from the access point would be directed to the network by the ISP, along with the AP ID, but the DSL ID would not be forwarded to the network provider. In such systems the network provider could identify the access point (from the AP ID) and the MSISDN/IMSI of the calling party, but would not be aware of the physical location at which the access point is located since it is not informed of the DSL ID associated with the DSL port into which the access point is plugged. In this or other situations, the IP address may not be available to the network provider.

This would be problematic for networks that wish to detect the location of the access point, for example to provide a reduced tariff for subscribers based on the location of the access point or to meet proposed regulatory regulations requiring network providers to know the location of all APs in their network. It would further prevent authentication of the AP by verifying the APs identity.

Therefore, a further embodiment of the invention enables the network provider to determine the location of an access point when the subscriber is communicating through an ISP for which the network has no visibility of DSL IDs and is not made aware of the DSL IDs, and has no visibility of IP addresses. This embodiment will be described with reference to FIG. 6.

At the point of purchase or registration of an access point the network will identify whether the subscriber is intending to use the AP via an ISP for which the network will be advised of the DSL ID during use of the AP. If not, the subscriber will be required to provide the network with the calling line ID (CLI) associated with DSL line through which they wish to direct traffic from their access point. The CLI is, effectively, the telephone number associated with the DSL line and a unique CLI exists from every fixed line. The CLI is transmitted during all communications from that DSL. The CLI is then stored in the network database 350 as part of the subscriber profile along with the AP IP, MSISDN etc as shown in Step 1 of FIG. 6.

In use, the access point 300 is connected to a DSL modem 310 and subsequently connected to the ISP via a DSL filter/splitter 320. The access point 300 is also connected to the public switched telephone network via an analogue POTS connection and via the DSL filter splitter 320. In this regard, the AP 300 includes analogue telephone capabilities. The AP is configured so that on power up it dials a predefined telephone number through its analogue POTS connection at Step 2. Preferably the predefined telephone number is an Interactive Voice Response (IVR) 330 associated with the network. As required by standard call set up procedure, the CLI associated with the line is transmitted to the destination called number. The IVR is therefore readily able to determine the CLI associated with the AP's incoming call.

On receipt of the incoming call, the IVR 330 also requests the AP ID of the calling access point. Preferably the AP recognises the request and returns its AP ID automatically using DTMF tones. Alternatively, however, this process is fully automated through pre-configuration of the AP, whereby the AP ID is preferably transmitted automatically without requiring a prompt from the network. In still further alternative, the subscriber enters the contact number for the network and AP ID manually, for example via a keyboard associated with the AP. The IVR may also be used to just receive the CLI associated with the AP, and the Concentrator 340 may receive the AP ID via the ISP in the manner described in the previous embodiments of the invention.

It is also to be appreciated that the IVR 330 is only an example arrangement for network to receive the AP ID and CLI, and that different arrangements may also be used.

On receipt of the CLI and AP ID, the IVR 330 forwards the CLI and AP ID onto the RNC concentrator 340 at Step 3. The RNC concentrator 340 compares the CLI and AP IDs with those values stored in the AP database 350 at step 4. If the CLI and AP ID match those stored in the database, the concentrator 340 can confirm that the AP is being used at the location for which the subscriber is registered. If the CLI does not match the registered CLI for that particular AP, the concentrator 340 can determine that the AP is not being used at the location at which it is registered.

When a subscriber is in his home location, traffic from his mobile terminal will be directed through AP 300 and onto the DSL line. The standard call-set up data traffic is transmitted along with the subscriber's MSISDN and the AP ID.

When this data arrives at the concentrator 340, the concentrator 340 will then look up and retrieve the appropriate data from database 350. If the subscriber's MSISDN is associated with the AP ID in the database 350, then the concentrator 340 will have verified that subscriber is entitled to use the AP 300.

If the subscriber is not registered to use the AP 300, the concentrator 340 will terminate the call at that point. In further embodiments the concentrator 340 may transmit an indication back to the phone that it is not permitted to communicate on the AP 300 and that it should switch to the macro network.

The concentrator 340 may be configured to determine whether a particular subscriber is entitled to a tariff reduction when using a given AP as an entry point to the mobile network, as in the previous embodiments.

When a subscriber makes a call through the AP, the concentrator 340 will receive the subscriber's MSISDN together with the applicable AP-ID. To verify whether the subscriber is authorised to a reduced tariff, the concentrator 340 checks the received data against the data recorded in database 350. For example, if the subscriber's MSISDN is listed as an "owner" in relation to the received AP ID, then the subscriber will be entitled to a reduced tariff for that call. On the other hand, where the subscriber's MSISDN is listed as a visitor, and therefore permitted to communicate through AP300 but not entitled to a reduced tariff.

Once the concentrator 340 has made a reduced tariff determination, the concentrator 340 transmits an indication to the core network of whether or not the subscriber is entitled to a reduced tariff for that call. As in the previous embodiments, this indication is made in the same format as a cell ID that would normally be sent to the core network 140 to identify a base station. The concentrator 135 substitutes the cell ID received from the AP 300 with a predefined ID value indicating whether the MSISDN is a visitor or owner. For example, the predefined value identifying that the subscriber is an owner might be "1111" and the predefined value identifying that the caller is a visitor could be "0000". This new form of Cell ID created by the concentrator 300 is "Reserved Cell ID". The Reserved Cell ID is received by the core network 140 in the same manner as it would receive a cell ID from a macro base station. Therefore, once the concentrator 340 determines if the subscriber is a registered owner/visitor, the concentrator 340 enters the appropriate code in the Reserved Cell ID, and the Reserved Cell ID along with the other call set up traffic, is transmitted to the core network as part of the normal call set up procedures.

Once the Core Network receives the Reserved Cell ID in the call set up procedure, it extracts the cell ID and passes it to the Location Based Charging (LBC) service logic component of the Intelligent Network (IN), which determines on what tariff the call should be charged. Normally the LBC service logic uses the cell ID to query the LBC database which stores the details of the cell IDs of the home macro base stations, for which each MSISDN is entitled to reduced tariffs.

The LBC database compares the received MSISDN and cell ID with those stored in the LBC database. It then informs the core network whether the call should be charged at reduced tariff or at the full tariff. In the present embodiment of the invention, with the concentrator 340 having already determined whether a reduced tariff applies, and notifying the core network of such using the special codes in the reserved cell ID, the LBC database can be used simply to record the meaning of the reserved cell ID codes rather than performing a full database query, and also rather than recording the potentially huge number of network APs in database.

In this regard, an advantage provided by this embodiment of the present invention is that the core network and LBC service logic does not have to recognise each and every AP ID. Instead, the concentrator 340 manages all the AP IDs. Therefore, this embodiment of the invention is able to identify whether or not a subscriber is entitled to a reduced tariff for a call by managing only two further cell IDs, namely one for the subscriber being an owner and one for the subscriber being a visitor.

In an alternative to this embodiment of the invention, the AP is registered for use at multiple locations. This is achieved by registering multiple CLIs against the subscriber profile in the database 350.

In still further alternative, the analogue call to the network is made periodically in order to allow the concentrator to check that the AP remains at the same CLI at certain time intervals after power up. If the concentrator 340 identifies that the CLI no longer matches that identified in the subscriber's profile, it can transmit an instruction to the AP to shut down the 3G air interface. Such an instruction could be sent via the ISP or over the air.

Figure 6:
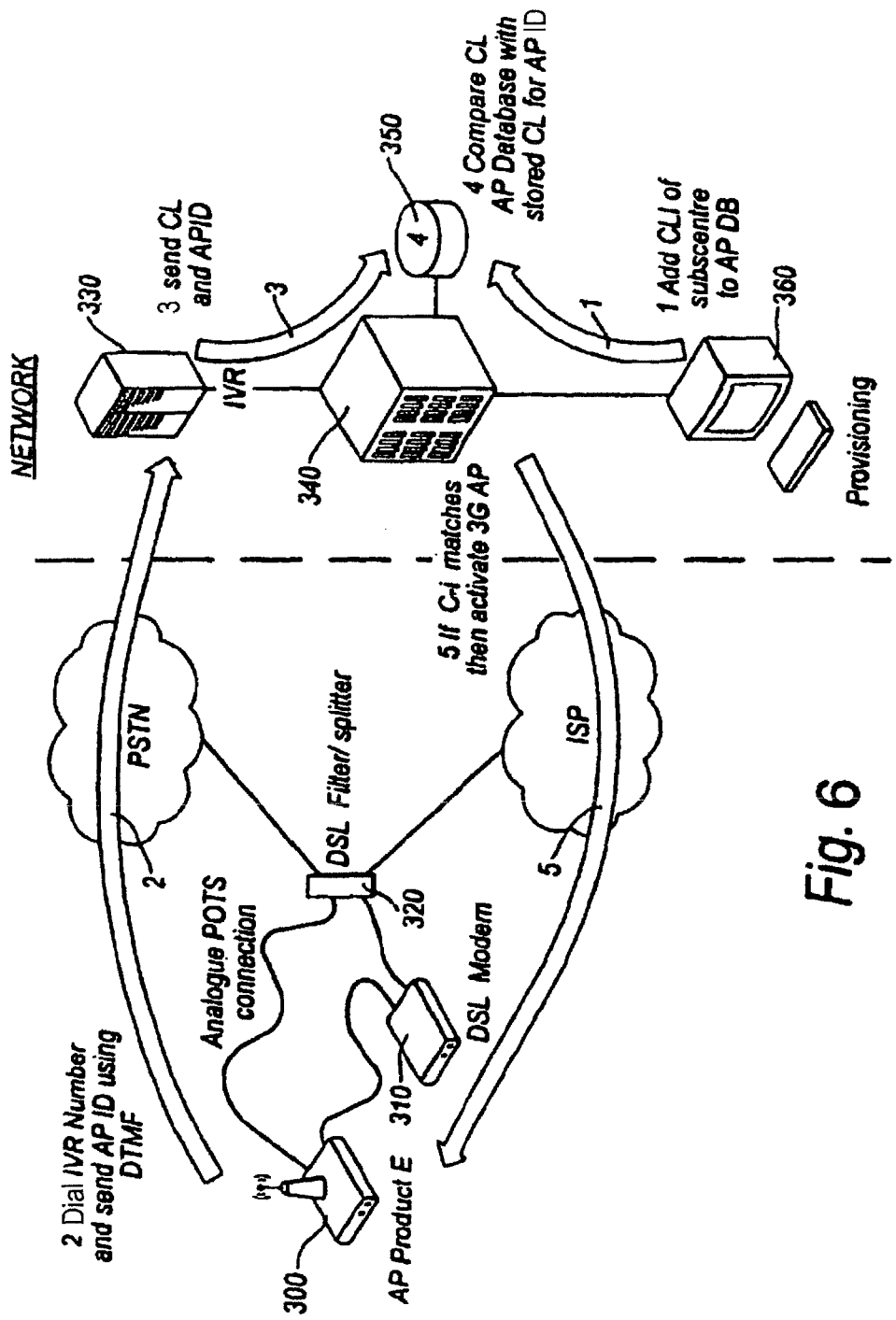
FIG. 6 illustrates a diagrammatic flowchart showing a procedure for verifying the location of an AP in a mobile telecommunications network according to a further embodiment of the invention.

Therefore, these embodiments of the invention described in relation to FIG. 6 enable the network provider to confirm the location of the AP in situations where it is not made aware of the DSL ID through which the AP is communicating and/or the IP address.

The access point may be configured to instruct the mobile terminal to display an indication—such as a visual indication, when it is connected to the network core via the access point. This may be particularly useful if communication services are charged for on a different basis when the mobile terminal is connected to the network core via the access point.

For instance, in the embodiments described above, the AP is configured to appear to the mobile terminal as a conventional base station that communicates with the UE using GSM/UMTS/LTE protocols in accordance with the Standards (where they exist) and the licensed radio spectrum. Alternatively, the AP could communicate with the UE by any other suitable technology—for example, by a Bluetooth® connection, WiFi or another unlicensed mobile access (UMA) protocol, which allows the GSM/UMTS/LTE features to be provided using a non-GSM/UMTS/LTE bearer technology.

It will be clear to those skilled in the art that embodiments of the present invention provides multiple ways in which information regarding usage of APs can be obtained monitored by a network. Embodiments of the invention enable a network, or the AP itself, to determine the IMSI or MSISDN calling through the AP, the AP ID and the location of the AP. The network can use this information in a manner of ways including: increasing the security of the APs, for example by detecting whether an AP is a bogus AP; for allowing users to restrict who is permitted to communicate through their AP (closed APs); for detecting whether a subscriber is entitled to a reduced tariff when communicating through and AP; and, meeting regulatory requirements and controlling the impact of APs on the macro network by detecting and controlling the locations in which an AP might be active.

The invention claimed is:

1. A method of controlling access to a telecommunications network core by a telecommunications device communicating via an IP-transport connected base station, the method comprising:

providing an intermediate node between the base station and the core for receiving identification data from the base station;

generating at the intermediate node an indication of the basis on which the telecommunications device is permitted to receive communication services from the core, wherein the intermediate node determines the basis on which the telecommunications device is permitted to receive communication services from the core, and wherein, according to said determination, the intermediate node selectively includes in the indication generated thereby a reserved value indicative of the basis on which the telecommunications device is permitted to receive communication services from the core but which indication is not used by the core to identify the particular base station; and transmitting the indication to the core in order to allow the core to use the indication in providing the permitted communication services to the telecommunications device.

2. The method of claim 1, wherein the indication generated at the intermediate node is of the same format as an indication of an identity of a cell occupied by the telecommunications device that is conventionally transmitted between the base station and the core network.

3. The method of claim 1, wherein the intermediate node receives from the base station an identity of a cell occupied by the telecommunications device.

4. A method of controlling access to a telecommunications network core by a telecommunications device communicating via an IP-transport connected base station, the method comprising:

providing an intermediate node between the base station and the core for receiving identification data from the base station;

generating at the intermediate node an indication of the basis on which the telecommunications device is permitted to receive communication services from the core, wherein the intermediate node determines the basis on which the telecommunications device is permitted to receive communication services from the core, and wherein, according to said determination, the intermediate node selectively includes in the indication generated thereby a reserved value indicative of the basis on which the telecommunications device is permitted to receive communication services from the core but which indication is not used by the core to identify the particular base station, and wherein, according to said determination, the intermediate node selectively generates the indication to include a flag indicative of the basis on which the telecommunications device is permitted to receive communication services from the core, the indication further including an identity of a cell occupied by the telecommunications device.

5. A method of controlling access to a telecommunications network core by a telecommunications device communicating via an IP-transport connected base station, the method comprising:

providing an intermediate node between the base station and the core for receiving identification data from the base station;

generating at the intermediate node an indication of the basis on which the telecommunications device is permitted to receive communication services from the core, wherein the intermediate node determines the basis on which the telecommunications device is permitted to receive communication services from the core, and wherein, according to said determination, the intermediate node selectively includes in the indication generated thereby a reserved value indicative of the basis on which the telecommunications device is permitted to receive communication services from the core but which indication is not used by the core to identify the particular base station, and wherein the reserved value indicates the charging scheme to be applied by the core to the communication services.

6. A method of controlling access to a telecommunications network core by a telecommunications device communicating via an IP-transport connected base station, the method comprising:
providing an intermediate node between the base station and the core for receiving identification data from the base station;
generating at the intermediate node an indication of the basis on which the telecommunications device is permitted to receive communication services from the core, wherein the intermediate node determines the basis on which the telecommunications device is permitted to receive communication services from the core, and wherein, according to said determination, the intermediate node selectively includes in the indication generated thereby a reserved value indicative of the basis on which the telecommunications device is permitted to receive communication services from the core but which indication is not used by the core to identify the particular base station, and wherein the intermediate node determines whether the base station is a valid base station and transmits an appropriate response signal to the device.

7. An intermediate node for controlling access to a telecommunications network core by a telecommunications device communicating via an IP-transport connected base station, the intermediate node being operable to:
receive identification data from the base station; and
generate at the intermediate node an indication of the basis on which the telecommunications device is permitted to receive communication services from the core., wherein the intermediate node is operable to determine the basis on which the telecommunications device is permitted to receive communication services from the core, and wherein, according to said determination, the intermediate node is operable to selectively include in the indication generated thereby a reserved value indicative of the basis on which the telecommunications device is permitted to receive communication services from the core but which indication is not used by the core to identify the particular base station; and
transmit the indication to the core in order to allow the core to use the indication in providing the permitted communication services to the telecommunications device.

8. The intermediate node of claim 7, wherein the indication generated at the intermediate node is of the same format as an indication of an identity of a cell occupied by the telecommunications device that is conventionally transmitted between the base station and the core network.

9. The intermediate node of claim 7, wherein the intermediate node is operable to receive from the base station an identity of a cell occupied by the telecommunications device.

10. An intermediate node for controlling access to a telecommunications network core by a telecommunications device communicating via an IP-transport connected base station, the intermediate node being operable to:
receive identification data from the base station; and
generate at the intermediate node an indication of the basis on which the telecommunications device is permitted to receive communication services from the core, wherein the intermediate node is operable to determine the basis on which the telecommunications device is permitted to receive communication services from the core, and wherein, according to said determination, the intermediate node is operable to selectively include in the indication generated thereby a reserved value indicative of the basis on which the telecommunications device is permitted to receive communication services from the core but which indication is not used by the core to identify the particular base station; and wherein, according to said determination, the intermediate node is operable to selectively generate the indication to include a flag indicative of the basis on which the telecommunications device is permitted to receive communication services from the core, the indication further including an identity of a cell occupied by the telecommunications device.

11. An intermediate node for controlling access to a telecommunications network core by a telecommunications device communicating via an IP-transport connected base station, the intermediate node being operable to:
receive identification data from the base station; and
generate at the intermediate node an indication of the basis on which the telecommunications device is permitted to receive communication services from the core, wherein the intermediate node is operable to determine the basis on which the telecommunications device is permitted to receive communication services from the core, and wherein, according to said determination, the intermediate node is operable to selectively include in the indication generated thereby a reserved value indicative of the basis on which the telecommunications device is permitted to receive communication services from the core but which indication is not used by the core to identify the particular base station, and wherein the reserved value indicates the charging scheme to be applied by the core to the communication services.

12. An intermediate node for controlling access to a telecommunications network core by a telecommunications device communicating via an IP-transport connected base station, the intermediate node being operable to:
receive identification data from the base station; and
generate at the intermediate node an indication of the basis on which the telecommunications device is permitted to receive communication services from the core., wherein the intermediate node is operable to determine the basis on which the telecommunications device is permitted to receive communication services from the core, and wherein, according to said determination, the intermediate node is operable to selectively include in the indication generated thereby a reserved value indicative of the basis on which the telecommunications device is permitted to receive communication services from the core but which indication is not used by the core to identify the particular base station, and wherein the intermediate node is operable to determine whether the base station is a valid base station and to transmit an appropriate response signal to the telecommunications device.

13. A telecommunications system, comprising:

a telecommunications core;

an IP-transport connected base station; and an intermediate node for controlling access to the core by a telecommunications device communicating via the base station, the intermediate node being operable to:

receive identification data from the base station;

generate at the intermediate node an indication of the basis on which the telecommunications device is permitted to receive communication services from the core, wherein, the intermediate node is operable to determine the basis on which the telecommunications device is permitted to receive communication services from the core, and, wherein, according to said determination, the intermediate node is operable to selectively include in the indication generated thereby a reserved value indicative of the basis on which the telecommunications device is permitted to receive communication services from the core but which indication is not used by the core to identify the particular base station; and transmit the indication to the core in order to allow the core to use the indication in providing the permitted communication services to the telecommunications device.

14. A telecommunications system, comprising:

a telecommunications core;

an IP-transport connected base station; and an intermediate node for controlling access to the core by a telecommunications device communicating via the base station, the intermediate node being operable to:

receive identification data from the base station;

generate at the intermediate node an indication of the basis on which the telecommunications device is permitted to receive communication services from the core, wherein, the intermediate node is operable to determine the basis on which the telecommunications device is permitted to receive communication services from the core, and, wherein according to said determination, the intermediate node is operable to selectively include in the indication generated thereby a reserved value indicative of the basis on which the telecommunications device is permitted to receive communication services from the core but which indication is not used by the core to identify the particular base station, wherein the reserved value is received by a location based charging service of the core and wherein the location based charging service uses the reserved value to look-up in a database the basis on which the telecommunications device is permitted to receive communication services from the core so that the user of the telecommunications device can be charged accordingly for the communication services.

* * * * *